Dec. 28, 1954  H. G. BECK  2,698,072
FLEXIBLE MOUNTING WITH GARNISH FLAP
Filed Oct. 31, 1950  3 Sheets-Sheet 1

INVENTOR
Howard G. Beck
BY Evans + McCoy
ATTORNEYS

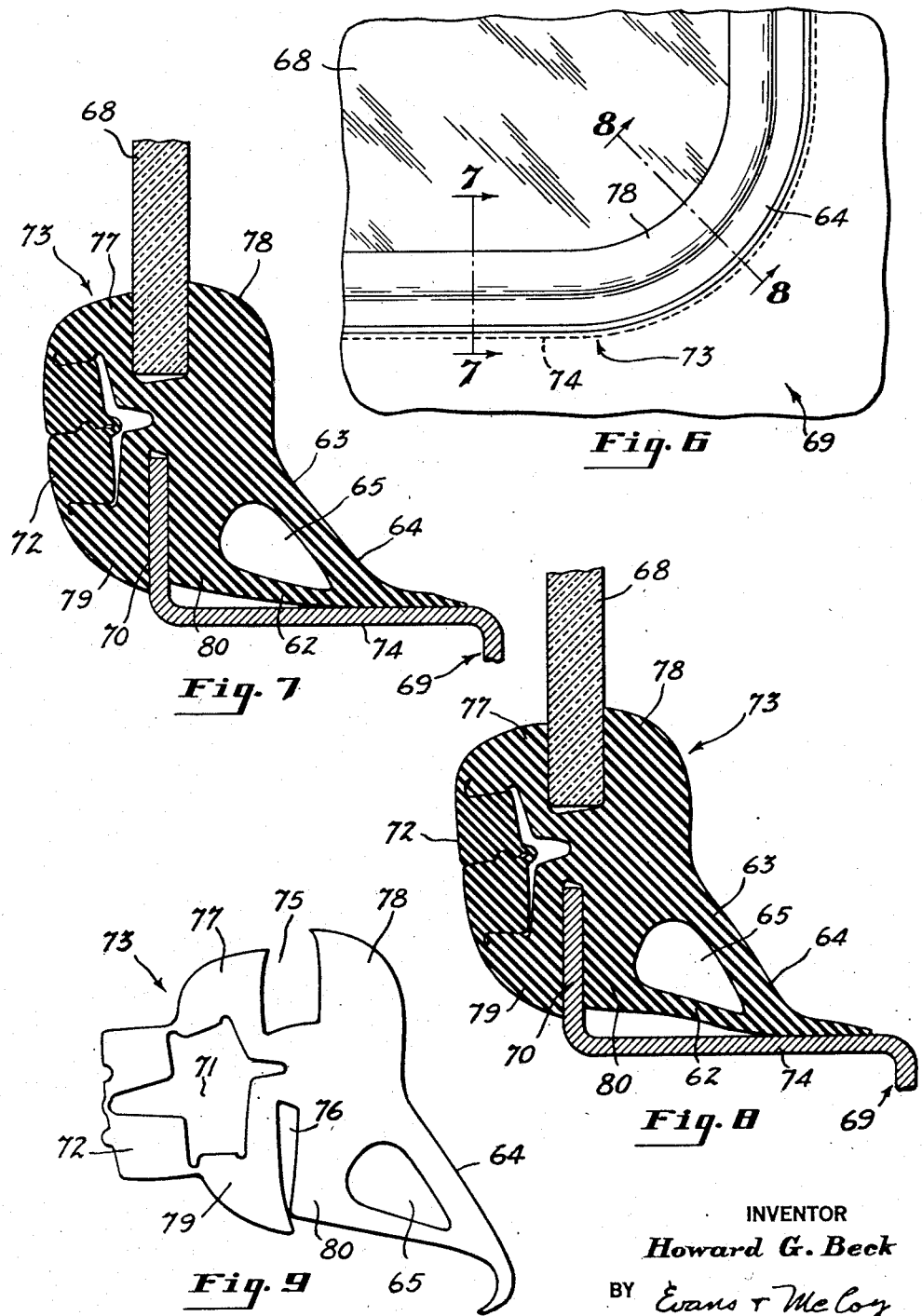

INVENTOR
Howard G. Beck
BY Evans + McCoy
ATTORNEYS

United States Patent Office 2,698,072
Patented Dec. 28, 1954

2,698,072

FLEXIBLE MOUNTING WITH GARNISH FLAP

Howard G. Beck, Irwin, Pa., assignor to The General Tire and Rubber Company, Akron, Ohio, a corporation of Ohio Application October 31, 1950, Serial No. 193,256

4 Claims. (Cl. 189—78)

This invention relates to flexible mounting strips for joining the edges of two panels, such as a window pane and a panel in which it is mounted, and for holding the two panels in fixed positions relative to each other and sealing the joint therebetween. More particularly, the invention involves such mounting strips having integrally formed trim flaps or garnish strips adapted to extend laterally over a portion of one of the panels to provide a tapered juncture therewith, hide unsightly structural forms, and enhance the general appearance of the joint.

Much effort has been devoted to providing inexpensive mounting strips of this character which are simple to install, attractive in appearance, and efficient in operation, particularly for use in mounting window glass in the body panels of automobiles, trucks, and other vehicles. While a considerable measure of success has been achieved in developing mechanically satisfactory flexible mounting strips, the appearance of the joints has left much to be desired.

One expedient widely employed for improving the appearance of the joints formed by such strips and covering adjacent, unsightly, body panel structures has involved forming a longitudinally extending groove in the side of the flexible mounting strip and mounting a separate metal trim strip in this groove. This expedient accomplished its function to a degree but was relatively expensive to employ and required considerable assembly time. Also while various metal trim strips have been tried, they have generally been unsatisfactory because they rested loosely against the panels to be covered thereby and would not closely hug and seal against them. Moreover, difficulty was encountered in forming such metal trim strips to fit around window corners because of their tendency to bulge and wrinkle at the bends therein.

According to the present invention, various forms of garnish flaps are formed integrally with the various forms of mounting strips in such a manner that the garnish flaps seal tightly against the vehicle body without bulging or wrinkling when bent around corners. The integrally formed garnish flaps may be relatively wide to cover any desired width of the surface of the adjacent panel, and the flaps are formed with a transverse curve therein to hold the free edge of the flaps tightly against the adjacent panel, as hereinafter described.

One object of the present invention is to provide a trim or garnish flap integral with mounting strips of the character described, thus eliminating the necessity for employing separate trim strips hung from or attached to the mounting strips.

Another object of the invention is to provide such a mounting strip and integral garnish flap adapted to fit along curved as well as straight joints between a pair of adjacent panels with the garnish flap hugging and sealing against one of the panels.

A more specific object of the invention is to provide such a mounting strip and integral garnish flap, particularly adapted for mounting a glass panel in the window openings of automobiles, trucks and other vehicles, with the garnish flap overlying a portion of the vehicle body panel surrounding the window opening.

Still other objects and advantages of the invention will appear from the following specification disclosing a number of embodiments of the invention for illustrative purposes, and from the accompanying drawings in which:

Fig. 6 is an elevational view of a corner of an automobile or truck window assembly incorporating a mounting strip with another form of integral garnish flap;

Fig. 7 is a sectional view taken along the line 7—7 of Fig. 6;

Fig. 8 is a sectional view taken along the line 8—8 of Fig. 6;

Fig. 9 is an end view of the mounting strip of Figs. 6, 7 and 8 showing the cross sectional configuration of the member as originally formed;

Figure 1:
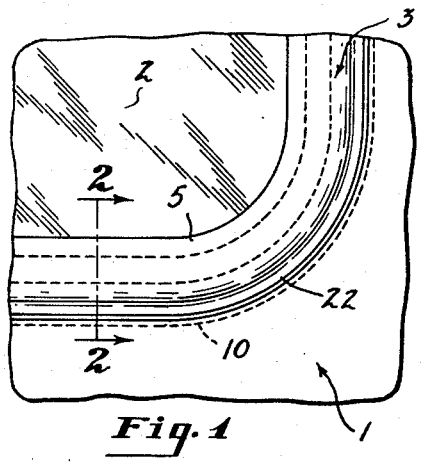
Figure 1 is an elevational view of a corner of an automobile or truck window assembly incorporating a mounting strip with an integral garnish flap in accordance with the present invention.

Referring to the drawings in which like numerals refer to like parts, and first to Figs. 1 to 5 thereof, the window assembly of an automobile, truck or other vehicle may comprise a frame panel 1 defining a window opening cut or formed therein, a glass pane 2 mounted in the opening, and an elongated flexible mounting strip 3 running completely around the window aperture between the edge of the frame panel 1 and the edge of the glass pane 2 in gripping and sealing engagement with both the panel and the pane.

The mounting strip 3 is preferably made of natural or synthetic rubber or other rubberlike material and may be formed by extrusion processes well known in the art to give a uniform cross section. As originally formed, the mounting strip 1 may have the cross sectional configuration illustrated in Fig. 3 in which flanges 4 and 5 project from the body of the strip to form a glass pane-receiving groove 8 and flanges 6 and 7 project from the body to form a metal panel-receiving groove 9, both grooves extending longitudinally of the mounting strip and the glass pane-receiving groove 8 generally being substantially wider than the metal panel-receiving groove 9. As shown, the grooves or channels 8 and 9 are formed in opposite edges of the mounting strip for respectively gripping the edge of the glass pane 2 and the edge of a substantially parallel flange 11 of the frame panel 1.

On one side of the mounting strip is a longitudinally extending hollow 12 substantially centered with respect to the bottoms of the grooves 8 and 9. The hollow 12 is shaped to receive suitable fillers which may comprise a pair of toggle elements 13 and 14, pressed tightly therein to expand the hollow 12 and force the mounting strip flanges 4 and 6 toward the flanges 5 and 7 respectively, thereby producing gripping pressures on opposite sides of the panels received in the grooves 8 and 9.

Figure 2:
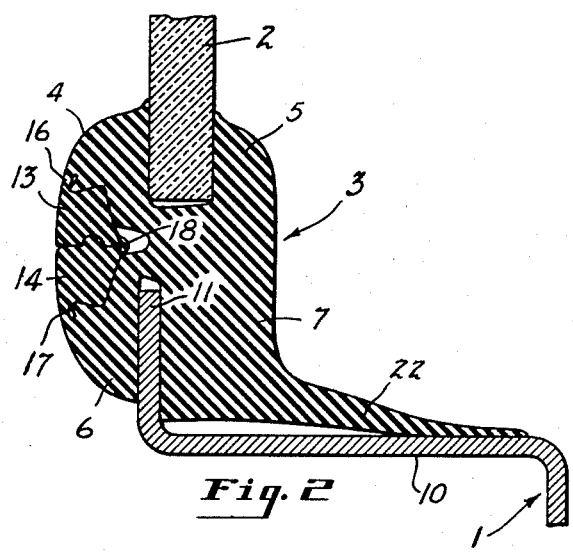
Fig. 2 is a sectional view taken as indicated by the line 2—2 in Fig. 1.

The toggle elements 13 and 14 are preferably formed integrally with the mounting strip to which they are attached by longitudinally extending webs or hinge portions 16 and 17, respectively, and may be joined to each other by a third web 18. The general configuration and dimensions of the toggle elements 13 and 14 and webs or hinges 16, 17, and 18 are selected so that they substantially fill the hollow 12 when pressed therein, as shown in Fig. 2, and so that they exert considerable outward pressure against opposite side walls of the hollow. The above described toggle structure and its mode of operation are the subject of my copending application Serial No. 119,852, filed October 6, 1949, for Flexible Toggle Seal, now U. S. Patent No. 2,625,715, issued January 20, 1953.

Figure 4:
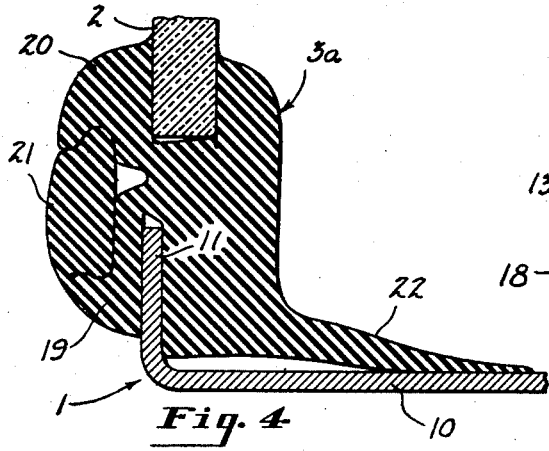
Fig. 4 is a sectional view similar to Fig. 2 except that the garnish flap is shown as being formed on a modified form of mounting strip.
Figure 3:
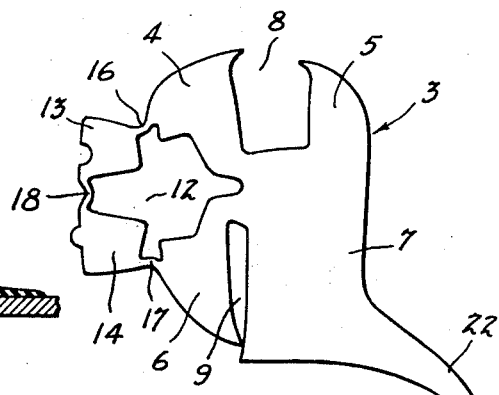
Fig. 3 is an end view of the mounting strip with one form of integral garnish flap showing the cross sectional configuration of the member as originally formed.
Figure 5:
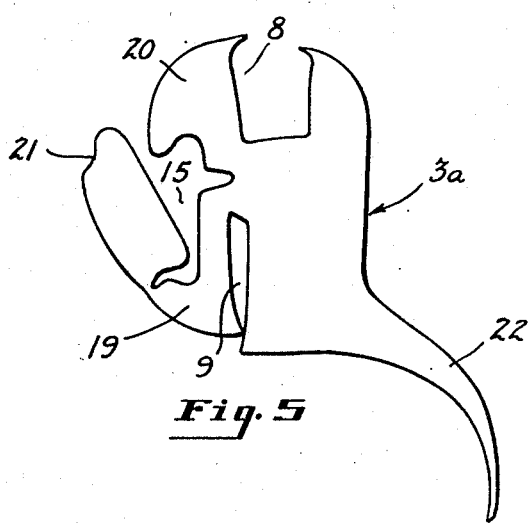
Fig. 5 is an end view of the mounting strip and integral garnish flap of Fig. 4 showing the cross sectional configuration of the member as originally formed.
Figure 10:
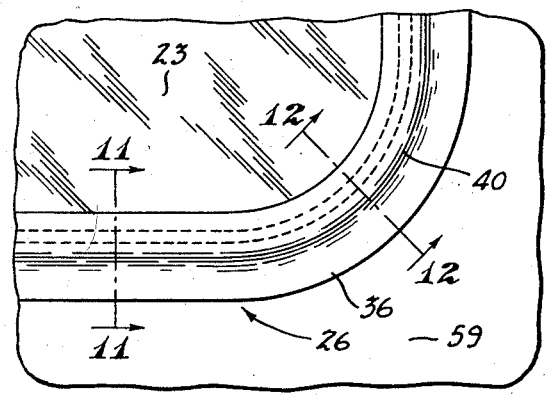
Fig. 10 is an elevational view of a corner of an automobile or truck window assembly with a mounting strip incorporating another form of integral garnish flap.
Figure 11:
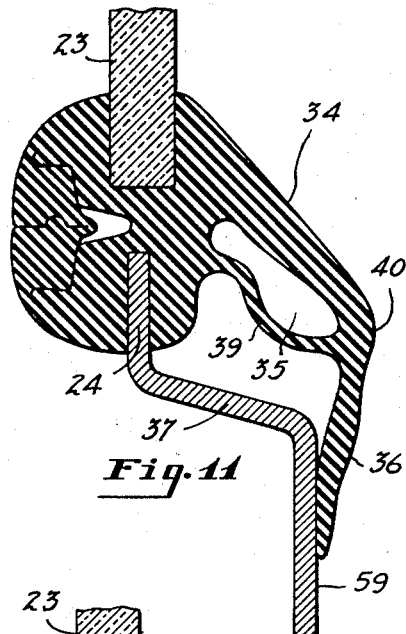
Fig. 11 is a sectional view taken along the line 11—11 of Fig. 10.

The mounting 3a of Figs. 4 and 5 corresponds to the mounting 3 of Figs. 2 and 3 respectively, and has an alternate form of filler or wedging means comprising a single hinge strip 21 integrally attached to one of the flanges 19 of a panel-receiving groove, the strip 21 being adapted to snap into a hollow or groove 15 in the side of the mounting strip similar to the hollow 12. The configurations and dimensions of the strip 21 are selected so that the strip performs an expanding function similar to the pair of toggle elements 13 and 14 on the mounting strip of Figs. 2 and 3. This structure and its mode of operation are the subject of my copending application Serial No. 138,671, filed January 14, 1950, for Flexible Windshield Mounting now U. S. Patent No. 2,625,716, issued January 20, 1953. Additional forms of fillers, such as the separate strip disclosed in U. S. Patent No. 2,189,138 to Ferdinand R. Eichner, are also satisfactory for utilization with this invention.

According to the present invention, a garnish flap 22 is integrally formed on the mounting strip of Figs. 1, 2 and 3, or Figs. 4 and 5 so as to overlie a metal panel portion 10 of the frame panel 1 with the outer or free edge of the garnish flap held in engagement with and exerting pressure against the panel portion to form a tightly sealed joint therebetween.

In the embodiments of the invention shown in Figs. 1 to 5 inclusive, the garnish flap or trim leg 22 is transversely tapered in cross-section and is formed on the side of the mounting strip opposite from the filler and adjacent the outer end of the groove-defining flange 7. The garnish flap is formed with a transverse panel gripping curve therein extending over substantially its entire width, the direction of the curve being toward the panel portion 10 against which the garnish flap rests in the final assembly. Straightening of the curve in the garnish flap in the process of assembling the mounting strip with the panels to be joined thereby is resisted by the inherent resiliency of the material and insures that the free edge of the garnish flap will lie flat against the panel portion entirely along the length of the joint. In other words, when the flap is straightened out, the transversely curved portion of the flap exerts pressure normal to the general plane of the outer portion of the flap and towards the mounting body panel portion.

In different vehicle body constructions, the panel portion 10 of the vehicle body may extend laterally and outwardly from the vertical flange portion 11 thereof at angles varying from 90 to 45 degrees or so with the plane of the flange 11, and the angle at which the garnish flap projects outwardly from the body of the mounting strip may be varied accordingly to obtain the desired pressure of the garnish flap against the panel portion. The transverse curve in the garnish flap may also be varied according to the sealing pressure desired and the relative disposition of the panel portion with respect to the flange portion 11.

When the mounting strip of Figs. 2 and 3 or Figs. 4 and 5 is assembled, as shown in Figure 1, the inherent elasticity of the material of which the mounting strip is made permits the mounting strip to be bent around curved corners of the window aperture without causing any material change in the cross-sectional configuration of the mounting strip along the length thereof in the final assembly, and the garnish flap will effectively hug and seal against the panel portion 23 entirely around the periphery of the window.

In the modified form of the invention shown in Figs. 6 to 9, the linear mounting 73 comprises two oppositely disposed panel receiving grooves 75 and 76, the groove 75 being formed by flanges 77 and 78 and receiving the glass panel 68, and the groove 76 being formed by flanges 79 and 80 and receiving upright portion 70 of the vehicle body 69. Intermediate the two grooves and on one side of the mounting strip is a longitudinal hollow 71 for receiving a suitable expanding or filler means, shown here as a toggle strip 72. It is to be understood that this expanding means can be any satisfactory strip, such as the hinged strip 21 of Figs. 4 and 5.

The garnish flap or trim leg 64 of this mounting strip is bifurcated adjacent the mounting strip with one fork or portion 62 connecting or integrating with the mounting body at flange 80 and with another fork or portion 63 integrating with the central portion of the mounting body. Forks 62 and 63 and the portion of the mounting body intermediate them define a longitudinal hollow or bore 65. The outer marginal portion of this garnish flap is formed with a transverse panel-gripping curve or bend so that it will press firmly against the flange or shelf 74 of the vehicle body 69 when assembled, as shown in Figs. 7 and 8. When the curved portion of this flap is straightened out, it exerts pressure normal to the general plane of the free-edge portion of the flap with a body hugging action.

One advantage of this garnish flap is that, along the curved portions or corners of the windows, the flap has less tendency to buckle outwardly. Instead, the outer or body-side forked portion 62 of the flap, when tensioned by bending the mounting strip around a window corner, tends to stretch and flatten, and the other forked portion 63, when compressed, tends to bend or bulge outward. By this combined action, the flap is prevented from buckling and is kept in tight hugging engagement with the body flange 74. Fig. 7 shows the mounting as assembled along a straight portion of the window with the forked portions of the flap in their usual relationship. Fig. 8, showing a cross-section taken at the window bend, illustrates how the exposed fork portion 63 is bulged or bent outward and the concealed fork portion 62 is flattened and in tension.

In the assembly shown in Figs. 10 to 14, the linear mounting 26 comprises a pair of oppositely disposed, panel receiving grooves or channels 27 and 28 with a longitudinal hollow 29 intermediate the grooves and on one side of the mounting strip. The groove 27 receives glass panel 23 and is formed by flanges 30 and 31, while the groove 28 receives the portion 24 of the vehicle body and is formed by flanges 32 and 33. A suitable filler, such as a toggle strip 25, fits into the hollow 29 to fill and expand it and force the flanges into tight engagement with the panel edges. As before, any other suitable wedging means may be employed, such as the hinged strip 21 shown in Figs. 4 and 5, or any other satisfactory expanding means.

The modification shown in Figs. 10 to 14 features a flap or leg bifurcated at the juncture with the mounting body with one fork or portion 34 connecting into the mounting toward the glass-panel side and the other fork 39 connecting into the mounting toward the center thereof. The forks or portions 34 and 39 and the center mounting body portion define a longitudinal hollow or bore 35.

Figure 13:
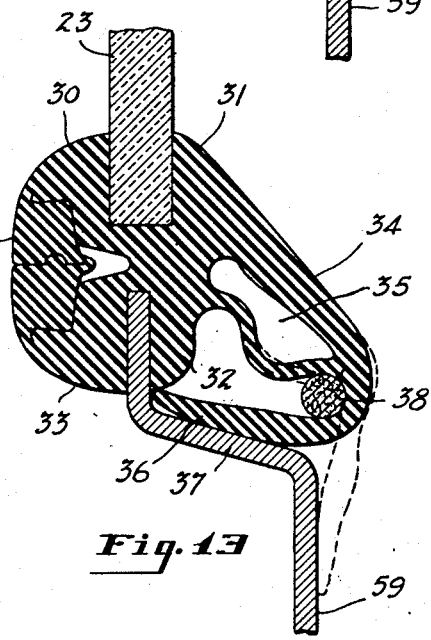
Fig. 13 is a sectional view similar to Figs. 11 and 12 but showing the structure at an intermediate stage in its assembly.
Figure 14:
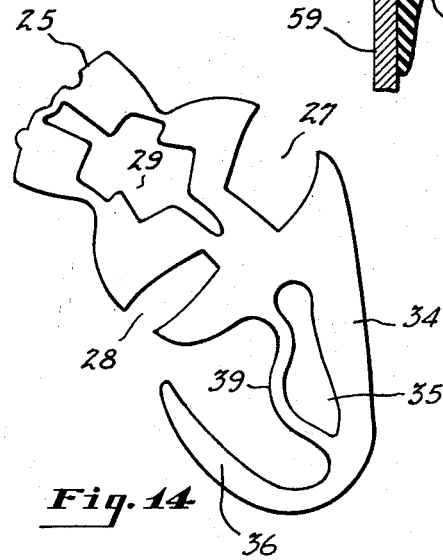
Fig. 14 is an end view of the mounting strip of Figs. 10, 11, 12 and 13, showing the cross sectional configuration of the member as originally formed.

As viewed in cross-section, the garnish flap of this modification has a relatively long finger 36 which loops or curves outwardly and back or returns toward the outer groove defining flange 32 as shown in Fig. 14. This return loop or curve is such that, when the mounting is initially assembled, the free edge of the flap curls and rests between the vehicle body shelf 37 and juncture of the flap portion with the mounting, as shown in Fig. 13. When assembled, the concave face of the curved portion of the flap faces and hugs the upright vehicle body flange or face 59. In order to pull the free edge of the flap out over the body flange, a cord or string 38 is inserted within the fold of the loop prior to assembly, and after the panel edges are firmly gripped, the cord is pulled out. This pulls the free edge of the flap out over the flange to the position shown in dot-dash lines in Fig. 13.

Figure 12:
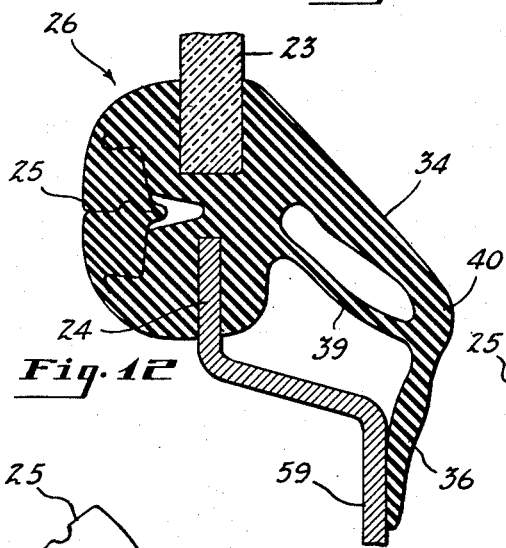
Fig. 12 is a sectional view taken along the line 12—12 of Fig. 11.

Another feature of this modification is the form of the fork portion 39 that extends from the knuckle portion of the garnish flap over to the central portion of the mounting strip opposite from the expanding means. As extruded, or in the unassembled form, this web or diaphragm 39 has a natural curve therein. Thus when the mounting is bent around a corner of the window, the curve straightens out and provides extra width to the flap, as shown in Fig. 12. The curve in the web or diaphragm 39 may be a simple one, or a compound one as shown. Either form functions to check the natural tendency of the knuckle portion 40 of the leg to spring outwardly where the strip is bent around a window corner, as illustrated by a comparison of the cross-section of Fig. 11 taken along a straight side of the window and the cross-section of Fig. 12 taken at a corner of the window. Fig. 12 shows the web 39 straightened out and pulling in on the knuckle portion 40 of the flap.

The mounting strips of the present invention are useful for many purposes other than the mounting of window glass in vehicle bodies. For example, they are adapted for use in windows of all types of vehicles and building structures, and for joining metal panels in household appliances and other devices.

The preferred mounting strips shown and described are susceptible to numerous modifications that will occur to those skilled in the art, and it will be understood that such modifications are intended to be included within the scope of the invention as provided in the patent statutes.

What I claim is:

1. A flexible mounting strip of rubber-like material for joining the edges of two panels, comprising an elongated body of substantially uniform cross-section having longitudinally extending grooves in opposite edges thereof, means integrally formed on one side of said body for resiliently urging the walls of said grooves against the surfaces of panels inserted therein, and a longitudinally extending transversely tapered garnish flap integrally formed on the opposite side of said body, the thick edge portion of said garnish flap being bifurcated to form a pair of web portions joining said body with a longitudinally extending hollow space therebetween, said garnish flap extending outwardly from said body and being formed with a simple transverse curve for exerting pressure normal to the general plane of the outer portion of the garnish flap when the flap is flexed to straighten said transverse curve.

2. A flexible mounting strip of rubber-like material for joining the edges of two panels, comprising an elongated body of substantially uniform cross-section having longitudinally extending grooves in opposite edges thereof, means integrally formed on one side of said body for resiliently urging the walls of said grooves against the surfaces of panels inserted therein, and a longitudinally extending garnish flap integrally formed on the opposite side of said body, said garnish flap extending outwardly from said body and being formed with a transverse curve in the outer portion thereof for exerting pressure normal to the general plane of the outer portion of the garnish flap when the flap is flexed to straighten its transverse curve, the inner portion of said garnish flap being hollowed to provide spaced web portions on opposite sides thereof, the web portion on the concealed side thereof being formed with a compound transverse curve therein to provide extensibility of its side margins without placing it under substantial transverse tension.

3. A flexible mounting strip of rubber-like material for joining the edges of two panels comprising an elongated body of substantially uniform cross-section, having longitudinally extending grooves in opposite edges thereof, and a longitudinally extending garnish flap integrally formed on one side of said body, said garnish flap extending outwardly from said body and being formed with a transverse curve over substantially its entire width for exerting pressure normal to the general plane of the outer portion of the strip when flexed to straighten its transverse curve, the portion of said garnish flap adjacent said body being hollowed to provide spaced web portions on opposite sides thereof, the web portion on the exposed side of the garnish strip being thicker than the web portion on the concealed side thereof, and the latter being formed with a compound transverse curve therein to facilitate straightening the curve of the garnish strip as a whole without buckling the thicker web.

4. A flexible mounting strip of rubber-like material for joining the edges of two panels in substantially the same plane with the adjacent edge portion of one panel forming a shoulder at an angle of from 45 to 90° to the plane of the panels comprising an elongated body of substantially uniform cross-section having longitudinally extending grooves in opposite edges thereof and a longitudinally extending garnish flap integrally formed on one side of said body, said garnish flap extending outwardly from said body and being formed with a transverse curve in the outer portion thereof for exerting pressure normal to the general plane of the outer portion of the garnish flap when the flap is flexed to straighten its transverse curve, the inner portion of said garnish flap being hollowed to provide spaced web portions on opposite sides thereof, the web portion on the concealed side thereof being formed with a compound transverse curve therein to provide extensibility of its side margins without placing it under substantial transverse tension.

References Cited in the file of this patent

UNITED STATES PATENTS

| Number | Name | Date |
|---|---|---|
| 1,854,032 | Holt | Apr. 12, 1932 |
| 2,189,138 | Eichner | Feb. 6, 1940 |
| 2,288,329 | Smith | June 30, 1942 |
| 2,492,566 | Geyer | Dec. 27, 1949 |
| 2,497,276 | Scott et al. | Feb. 14, 1950 |

FOREIGN PATENTS

| Number | Country | Date |
|---|---|---|
| 411,609 | Great Britain | June 14, 1934 |
| 620,325 | Great Britain | Mar. 23, 1949 |